United States Patent [19]

Scott

[11] 4,243,968
[45] Jan. 6, 1981

[54] TEMPERATURE SENSING UNIT, PARTS THEREFOR AND METHODS OF MAKING THE SAME

[75] Inventor: Douglas R. Scott, Knoxville, Tenn.

[73] Assignee: Robertshaw Controls Company, Richmond, Va.

[21] Appl. No.: 33,331

[22] Filed: Apr. 25, 1979

[51] Int. Cl.³ .............................................. H01C 3/04
[52] U.S. Cl. ........................................ 338/28; 29/613; 338/25; 338/334
[58] Field of Search .................... 338/22, 23, 24, 25, 338/28, 229, 333, 334; 29/612, 613; 73/362 AR

[56] References Cited

U.S. PATENT DOCUMENTS

| 3,919,680 | 11/1975 | Ueno et al. | 338/22 R X |
|---|---|---|---|
| 4,134,095 | 1/1979 | Reddy | 338/25 |
| 4,155,063 | 5/1979 | Bowman | 73/362 AR X |
| 4,166,389 | 4/1979 | Montren | 73/362 AR X |

Primary Examiner—C. L. Albritton
Attorney, Agent, or Firm—Candor, Candor & Tassone

[57] ABSTRACT

A temperature sensing unit having a housing provided with a chamber therein leading from a temperature sensing area of the housing to a connector area of the housing and having an electrical temperature sensor disposed in the sensing area and interconnected by leads to electrical connectors disposed in the connector area with a preformed one-piece resilient sealing member being disposed in the chamber to sealingly seal itself to the housing and secure the sensor, leads and connectors in place, the sealing member having been formed separately from the leads, connectors, sensor and housing.

40 Claims, 15 Drawing Figures

4,243,968

TEMPERATURE SENSING UNIT, PARTS THEREFOR AND METHODS OF MAKING THE SAME

BACKGROUND OF THE INVENTION

1. Field of the Invention

This invention relates to an improved temperature sensing unit and to improved sealing means for such unit or the like as well as to methods of making such a temperature sensing unit and sealing means therefor.

2. Prior Art Statement

It is known to provide a temperature sensing unit having a housing means provided with a chamber therein leading from a temperature sensing area of the housing means to a connector area of the housing means and having an electrical temperature sensor disposed in the temperature sensing area and interconnected by leads means to electrical connector means disposed in the connector area with sealing means being disposed in the chamber to sealingly fill the same and secured the sensor, lead means and connector means in place.

One such prior known temperature sensing unit has the sealing means formed from a potting material that subsequently holds the parts together when the potting material solidifies.

Another such prior known temperature sensing unit has the sealing means premolded with the lead means molded therein and then such premolded sealing means and its attached lead means is secured in the housing means of the sensing unit to complete the same. For example, see the U.S. Pat. No. 4,134,095—Reddy.

In order to eliminate the aforementioned complicated potting method, it was suggested by another employee of applicant's assignee that perhaps the potting material could be replaced by a plurality of preformed resilient parts formed separately from the lead means, connector means, sensor and housing means.

SUMMARY OF THE INVENTION

One feature of this invention is to provide improved sealing means for a temperature sensing unit wherein the improved sealing means will secure and seal the sensor, lead means and connector means of the temperature sensing unit in their assembled relation.

In particular, it was found according to the teachings of this invention that the sealing means can comprise a preformed one-piece resilient means that can be readily folded to sealingly fill a chamber of a temperature sensing unit and secure the temperature sensor, lead means, and connector means of the temperature sensing unit in place without requiring the prior known potting arrangement and without providing a plurality of separate parts for forming the sealing means as suggested by another.

In this manner, the improved temperature sensing unit of this invention can be simply and inexpensively made by the methods of this invention and can be readily disassembled for salvage or repair of the parts thereof because no potting compound is utilized that complicates such disassembling operation.

For example, one embodiment of this invention provides a temperature sensing unit having a housing means provided with a chamber therein leading from a temperature sensing area of the housing means to a connector area of the housing means and having an electrical temperature sensor unit disposed in the sensing area and interconnected by lead means to electrical connector means disposed in the connector area with sealing means being disposed in the chamber to sealingly fill the chamber and secure the sensor, lead means and connector means in place, the sealing means of this invention comprising a preformed one-piece resilient member that was formed separately from the lead means, connector means, sensor and housing means.

Accordingly, it is an object of this invention to provide an improved temperature sensing unit having one or more of the novel features of this invention as set forth above or hereinafter shown or described.

Another object of this invention is to provide a method of making such a temperature sensing unit, the method of this invention having one or more of the novel features of this invention as set forth above or hereinafter shown or described.

Another object of this invention is to provide an improved sealing means for such a temperature sensing unit, the sealing means of this invention having one or more of the novel features of this invention as set forth above or hereinafter shown or described.

Another object of this invention is to provide a method of making such an improved sealing means for such a temperature sensing unit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
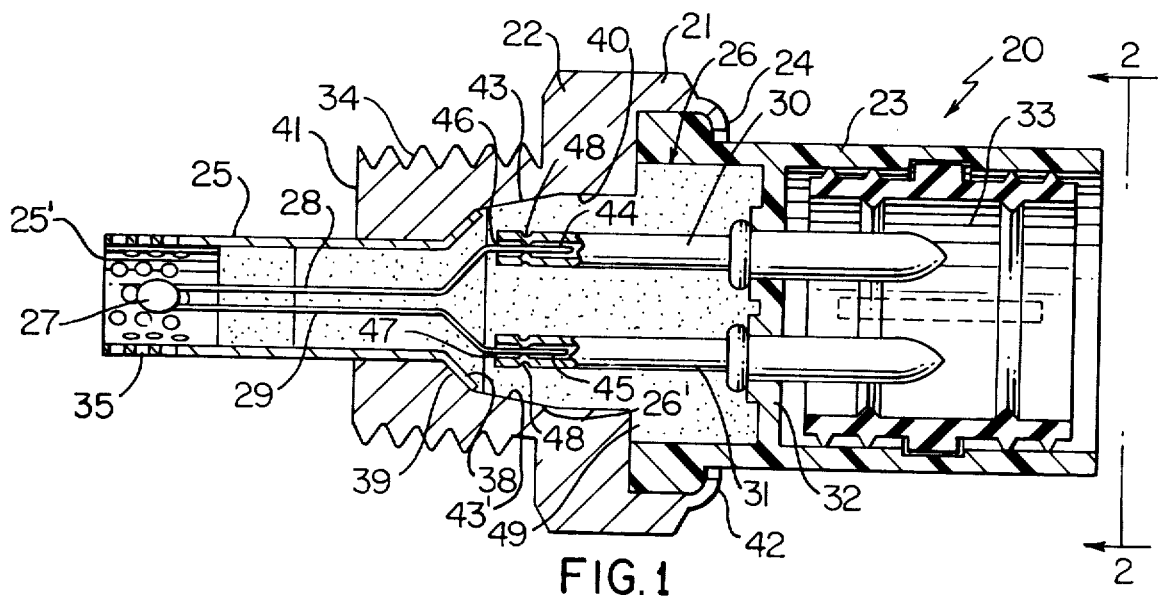
FIG. 1 is a cross-sectional view illustrating the improved temperature sensing unit of this invention.

While the various features of this invention are hereinafter described and illustrated as being particularly adapted to provide a temperature sensing unit for sensing the intake manifold temperature of an internal combustion engine or the like, it is to be understood that the various features of this invention can be utilized singly or in any combination thereof to provide a temperature sensor unit for other devices as desired.

Therefore, this invention is not to be limited to only the embodiment illustrated in the drawings, because the drawings are merely utilized to illustrate one of the wide variety of uses of this invention.

Figure 2:
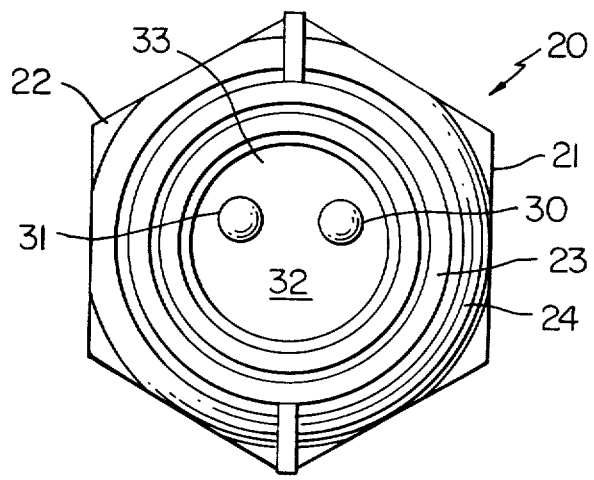
FIG. 2 is an end view of the temperature sensing unit of FIG. 1 and is taken in the direction of the arrows 2—2 of FIG. 1.

Referring now to FIGS. 1 and 2, the improved temperature sensing unit of this invention is generally indicated by the reference numeral 20 and comprises a housing means 21 formed from a main body 22 that is secured to a tubular connector extension 23 by a turned over flange 24 of the body 22 and to a tubular section or shroud 25 by an improved sealing member of this invention that is generally indicated by the reference numeral 26 and will be herinafter described in detail.

The temperature sensing unit 20 includes an electrical temperature sensor 27 disposed adjacent the open end 25' of the tubular shroud 25 and is interconnected by a pair of electrical leads 28 and 29 to a pair of electrical plug-in pin connectors 30 and 31 which project through an internal wall 32 of the tubular connector section 23 to be received in an open end 33 thereof whereby a suitably shaped electrical female part can be telescoped therein in a manner well known in the art to electrically interconnect the desired device to the sensor 27.

In this manner, the temperature sensing unit 20 is adapted to be fastened to any desired structure, such as by being threaded into a threaded opening in an intake manifold (not shown) of an internal combustion engine by having an externally threaded section 34 of the main body 22 threaded in such threaded opening. Thus, the tubular section or shroud 25 will be disposed in the area in which it is desired to sense the temperature thereof and the fluid in such area can pass through the tubular shroud 25 and across the temperature sensor 27 by passing through suitable openings 35 formed in the tubular section or shroud 25.

From the above, it can be seen that the tubular shroud 25 defines a temperature sensing area for the housing means 21 while the connector 23 defines an electrical connector area for the housing means 21.

While the temperature sensor 27 can comprise any suitable electrical temperature sensor, the same can comprise a conventional thermistor so that the resistance thereof will change in relation to the temperature thereof and such resistance can be measured by conventional means interconnected to or plugged onto the pin connectors 30 and 31 in a manner well known in the art.

As previously stated, it is one of the features of this invention to provide an improved sealing means for the unit 20 that will prevent fluid from passing from the temperature sensing section 25 to the pin connector section 23 of the housing means 21 with such sealing means having the additional purpose of securing the temperature sensor 27, lead means 28 and 29 and pin connector means 30 and 31 in the proper assembled position in the housing means 21.

In addition, the improved sealing means 26 of this invention secures the tubular section or shroud 25 to the main body 22 in a manner hereinafter described.

Figure 5:
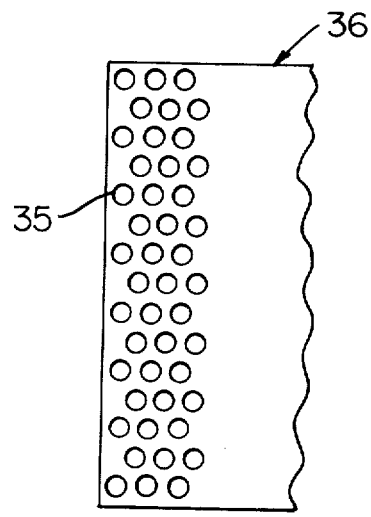
FIG. 5 is a fragmentary plan view of the blank utilized to form the part of FIG. 3.
Figure 3:
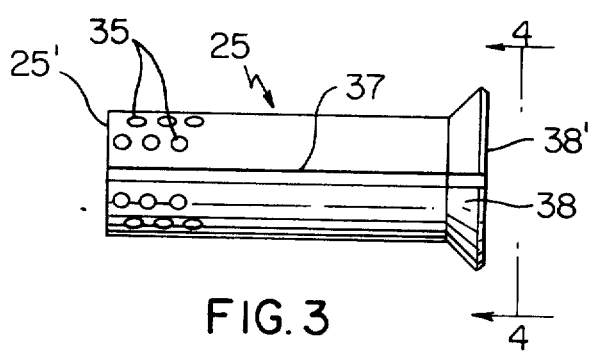
FIG. 3 is a side view of one of the parts of the temperature sensing unit of FIG. 1.
Figure 4:
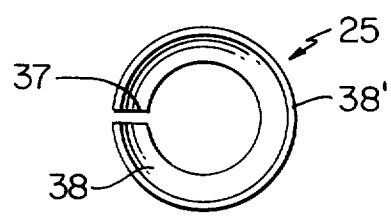
FIG. 4 is an end view of the part illustrated in FIG. 3 and is taken in the direction of the arrows 4—4 of FIG. 3.

As illustrated in FIGS. 3, 4 and 5, the tubular section or shroud 25 can be formed from a flat blank 36 of suitable material so that the resulting tubular section 25 formed therefrom in any suitable manner as illustrated in FIGS. 3 and 4 has a slit 37 extending between the opposed ends 25' and 38' thereof, the end 38' being outwardly flared to define a frusto-conical end flange 38 which is adapted to mate with a corresponding frusto-conical surface 39 in the main body 22.

In particular, the main body 22 has an opening 40 passing completely therethrough between the opposed ends 41 and 42 thereof which defines a chamber 43 therein that is adapted to be sealingly filled with the sealing means 26 of this invention in a manner hereinafter set forth.

Figure 6:
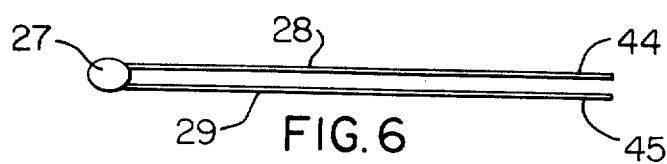
FIG. 6 is a side view of the temperature sensor utilized in the temperature sensing unit of FIG. 1.

As illustrated in FIG. 6, the temperature sensor 27 has the pair of leads 28 and 29 extending therefrom which are adapted to have the free ends 44 and 45 thereof respectively received in openings 46 and 47 of the pin connectors 30 and 31 to be fastened therein by suitable crimping at 48 in a manner well known in the art so that the leads 28 and 29 are electrically interconnected to the pin connectors 30 and 31.

Figure 11:
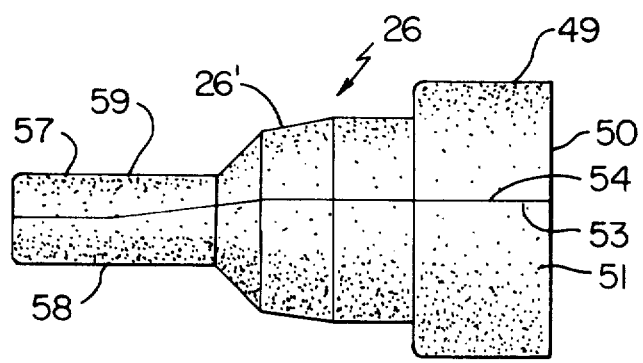
FIG. 11 is a side view of the sealing means of FIG. 7 with the sealing means being disposed in its folded condition.

The improved sealing means 26 of this invention is best illustrated in FIGS. 7-11 and comprises a one-piece preformed resilient member 49 formed of two parts 50 and 51 integrally hinged together by a short flexible hinge section 52 whereby the two parts 50 and 51 can be folded together as illustrated in FIG. 11 to form a configuration that will be under radial compression in the chamber 43 of the housing means 21 as illustrated in FIG. 1 for a purpose hereinafter described.

While the sealing means 26 can be formed of any suitable material, the same can be formed of a rubber material which will be sufficiently resilient to permit the desired sealing effect thereof in the manner hereinafter described and still be of sufficient strength to hold the parts of the temperature sensing unit 20 together as will be apparent hereinafter. For example, the resilient material that forms the sealing means 26 can have a durometer rating of approximately 80.

In any event, it can be seen that the one-piece resilient member 49 can be molded into the configuration illustrated so that the parts 50 and 51 respectively have substantially flat surfaces 53 and 54 each provided with a pair of grooves 55 and 56 which will meet together to compact the left hand ends of the pin connectors 30 and 31 therebetween when the resilient member 49 is folded about the pin connectors 30 and 31. The left hand ends 57 and 58 of the parts 50 and 51 are so shaped that the same permit the sensor 27 to be centrally located in the tubular section or shroud 25 and the pins 30 and 31 to be offset relative to the longitudinal axis of the tubular connection section 23 as illustrated with the lead means 28 and 29 extending therebetween and conforming to the contour of the surfaces 53 and 54 for such offset alignment of the pin connectors 30 and 31 relative to the tubular connector section 23.

In this manner, by having the pair of connector pins 30 and 31 offset, the female plug connector to connect to the pins 30 and 31 can also be offset so as to only connect thereto in a certain oriented position of the female connector relative to the pins 30 and 31 in a manner well known in the art so the proper sockets of the female connector will be connected to the proper male connectors.

The left hand ends of the parts 50 and 51 of the resilient member 49 fold together as illustrated in FIG. 11 to form a cylindrical part 59 that is adapted to be received in the tubular shroud 25 in a radially compressed manner so as to tend to radially expand the tubular section 25 against the housing part 22 to positively mate the flared end 38 against the mating surface 39 of the main body 22 as illustrated in FIG. 1 and thereby firmly fasten the tubular section 25 to the main body 22 solely through the compressed relation of the folded one-piece resilient sealing member 49.

In addition, the size of the tapered portion 26' of the sealing means 26 and the length of the sealing means 26 in its folded condition as illustrated in FIG. 11 is such that the sealing means 26 will be placed under radial compression in the chamber 43 of the housing means 21 by being axially wedged or forced against the tapered surface 43' of the housing means 21 when the flange 24 thereof is crimped against the assembled end connector 23 as illustrated in FIG. 1. In this manner, the radial compression of the sealing means 26 not only causes the sealing means 26 to seal against the internal surface of the housing means 21, but also to seal about the leads 28, 29 and pin connectors 30 and 31 so to prevent any fluid communication between the end sections 25 and 23 of the housing means 21 and to hold the parts 27, 28, 29, 30, 31 and 25 in their assembled relation as illustrated in FIG. 1.

While the various parts of the temperature sensing unit 20 of this invention can be assembled in any desired sequence, the present preferred method of making the temperature sensing unit 20 will now be described.

Figure 7:
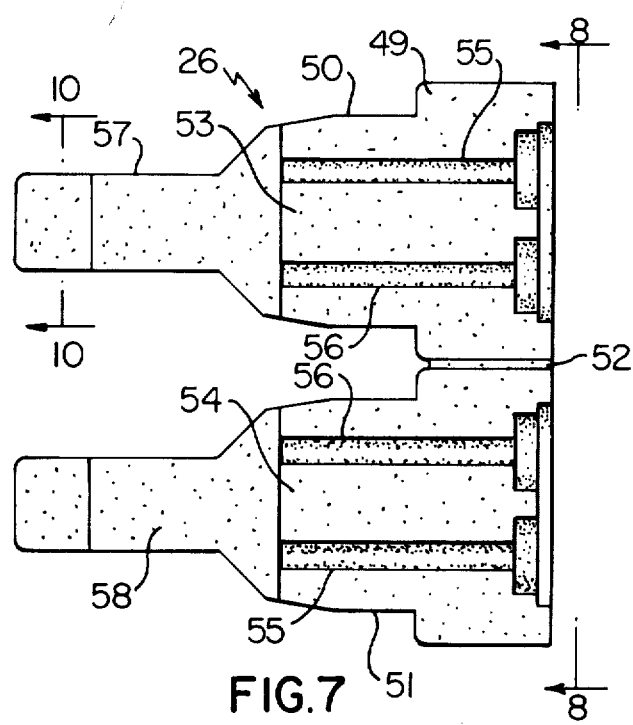
FIG. 7 is a top view of the improved sealing means of this invention utilized to form the sealing means for the temperature sensing unit of FIG. 1, FIG. 7 illustrating the sealing means in its normal unfolded condition.
Figure 8:
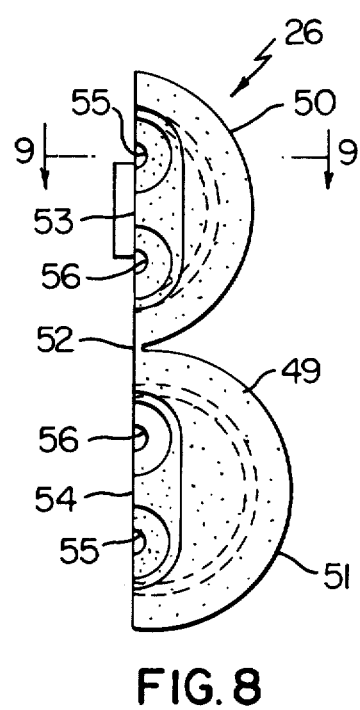
FIG. 8 is an end view of the sealing means illustrated in FIG. 7 and is taken in the direction of the arrows 8—8 of FIG. 7.
Figure 9:
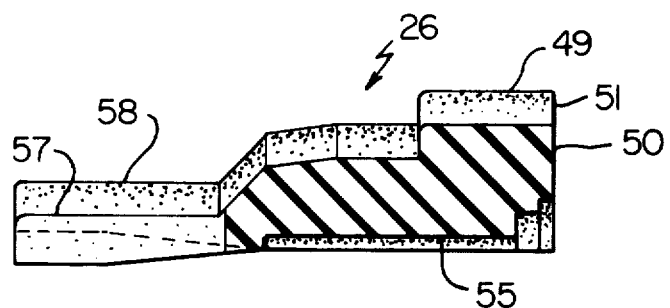
FIG. 9 is a cross-sectional view taken on line 9—9 of FIG. 8.
Figure 10:
FIG. 10 is a cross-sectional view taken on line 10—10 of FIG. 7.

With the resilient member 26 disposed in the open condition illustrated in FIG. 7, and with the temperature sensor 27 having its leads 28 and 29 properly secured to the pin connectors 30 and 31 in the manner previously described, the temperature sensor 27, leads 28 and 29 and pin connectors 30 and 31 are disposed on one of the parts 50 and 51 in the proper position thereon so that the left hand end of the connectors 30 and 31 are in the grooves 55 and 56 and the other part 50 and 51 is then folded over against the same to form the resilient member 49 into the configuration illustrated in FIG. 11 wherein the pin connectors 30 and 31 will extend from the right hand thereof and the temperature sensor 27 will extend from the left hand end thereof.

Thereafter, the tubular section or shroud 25 is inserted onto the cylindrical extension 59 illustrated in FIG. 11 and is forced thereon as the same can expand because of the split 37. In this manner, the shroud 25 now holds the folded resilient member 49 in its folded condition to make the same now easier to handle.

In particular, once the tubular section 25 is in place on the folded resilient means 26, the tubular section 25 and the resilient means 26 is inserted through the end 42 of the main body 22 to force the tubular section 25 through the opening 40 until the flange 38 abuts against the mating surface 39 of the main body 22 with the sealing means 26 compressing against the internal peripheral surface of the main body 22 to completely seal and fill the chamber 43.

Either before or after the resilient member 26 is inserted into the main body 22, the tubular pin connector 23 can be inserted on the right hand end of the folded resilient member 49 so that the pins 30 and 31 will extend out through suitable openings in the wall 32 thereof as illustrated in FIG. 1.

Thereafter, because of the initial lengths of the sealing means 26, the tubular connector 23 is forced axially toward the main body 22 to compress the sealing means 26 in the chamber 43 and thereby cause the radially compression thereof through the cooperating tapering surfaces 43' and 26'. When the tubular connector 23 abuts the main body 22, the end 42 of the main body 22 is turned over the tubular connector 23 at 24 to fasten the same together as illustrated in FIG. 1 and hold the sealing means 26 under radial compression whereby it can be seen that the temperature sensing unit 20 of this invention can be formed of a relatively few parts in a relatively simple manner by the method of this invention to operate in a conventional manner. In particular, the temperature sensor 27 is adapted to sense the temperature of fluid adjacent the end 25' of the tubular section 25 and transmit the sensed temperature in the form of a changed resistance thereof that is sensed through the leads 28 and 29, pins 30 and 31 and a suitable female connector plugged into the tubular connector 23 on the right hand end of the pins 30 and 31 and interconnected to measuring means in a manner well known in the art.

Thus, it can be seen that the sealing means 26 of this invention comprises a one-piece member which is adapted to not only seal the tubular section 25 from the pin connector 23 of the housing means 21 so that no fluid can pass through the opening 40 of the main body 22, but also the one-piece resilient member 26 firmly holds not only the temperature sensor 27, leads 28 and 29 and pins 30 and 31 in their assembled condition, but also the resilient member 26 holds the tubular shroud 25 in its assembled condition to the main body 22 without requiring auxiliary fastening means or the like. This feature is accomplished by the sealing means 26 being placed under axial compression between the assembled parts 22 and 23 so that the cooperating wedging surfaces 43' and 26' of the main body 22 and sealing means 26 places the sealing means 26 under radial compression.

While the parts of the temperature sensing unit 20 of this invention can be formed of any suitable material, the main housing body 20 can be formed of brass and the pin connector 23 can be formed of plastic material, the shroud 25 being formed of any suitable metallic material that can withstand the temperatures normally encountered by the unit 20.

However, it may be found that under extreme temperature conditions, the left hand flange of the plastic tubular connector 23 that is being held by the turned or staked flange 24 of the brass housing 22 will expand and cause the flange 24 to yield slightly and thereby result in a loose joint when the unit 20 subsequently cools down.

In order to eliminate this problem, the resilient sealing means 26 of this invention can be provided with an outwardly directed substantially annular flange that would be disposed between the main body 22 and the left hand flange of the connector 23, if desired.

Figure 12:
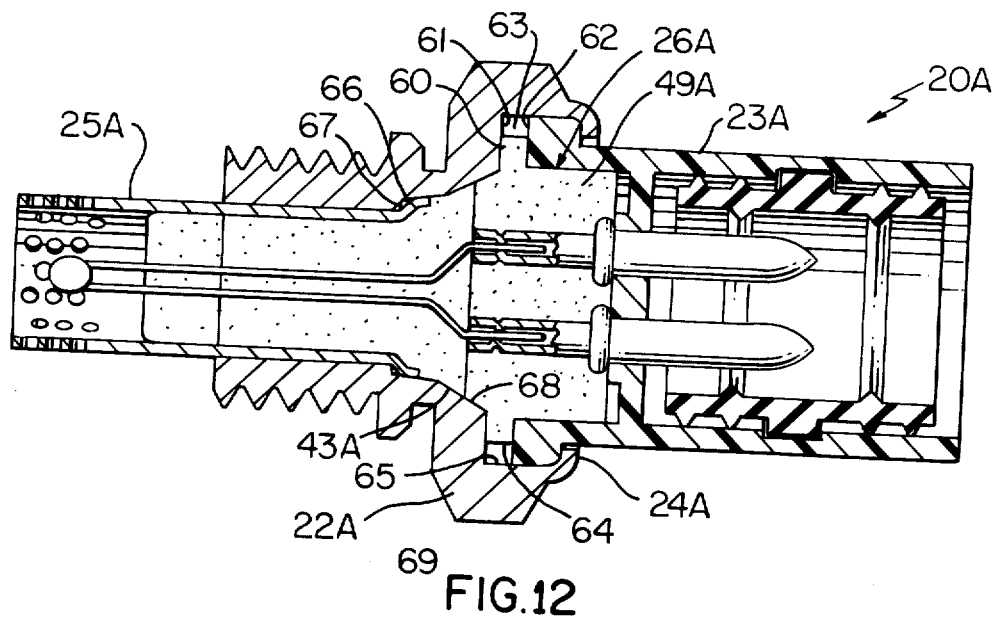
FIG. 12 is a view similar to FIG. 1 and illustrates another embodiment of the improved temperature sensing unit of this invention.

For example, reference is now made to FIG. 12 wherein another embodiment of the temperature sensing unit of this invention is generally indicated by the reference numeral 20A and parts thereof similar to the unit 20 previously described are indicated by like reference numerals followed by the reference "A."

As illustrated in FIG. 12, the resilient sealing member 49A has an outwardly directed flange 60 adapted to be disposed between the shoulder 61 of the main body 22A and the left hand flange 62 of the tubular connector 23A while providing a radial space 63 between the outer peripheral edge 64 of the flange 60 and the internal peripheral surface 65 of the main body 22A even though the resilient sealing means 26A is placed under axial compression when the two parts 22A and 23A are assembled together as previously described.

In this manner, any expansion of the flange 62 of the tubular connector 23A due to excessive heating thereof will compress the flange 60 of the resilient means 26A and extrude the same radially outwardly into the space 63 and thereby protect any overstressing of the staked flange 24A holding the tubular connector 23A in place. Upon subsequent cooling, the flange 60 of the resilient means 26A expands and the joint between the main body 22A and the tubular connector 23A remains tight.

Figure 13:
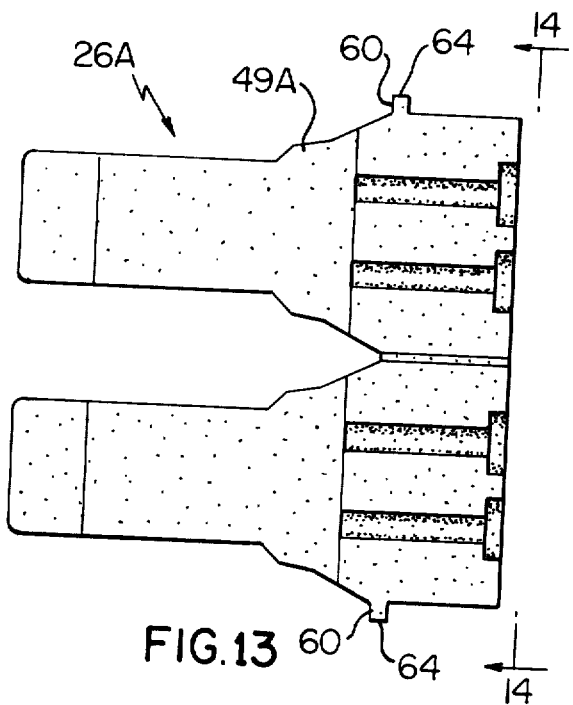
FIG. 13 is a view similar to FIG. 7 and illustrates the sealing means of the unit of FIG. 12.
Figure 14:
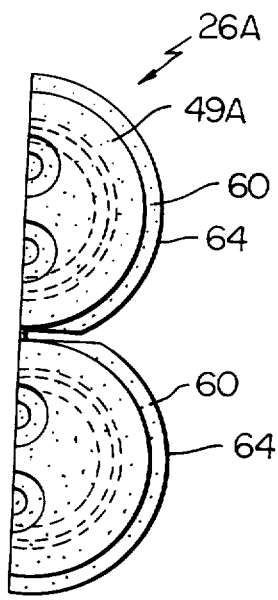
FIG. 14 is an end view of the sealing means of FIG. 13 and is taken in the direction of the arrows 13—13 of FIG. 13.

As illustrated in FIGS. 13 and 14, the flange 60 of the resilient means 26A will not form a complete circle when the resilient means 26A is in its folded condition but this provides no problems since the flange 60 does not provide a sealing function as it is the main body part of the resilient means 26A that performs the sealing function in the manner previously described.

Figure 15:
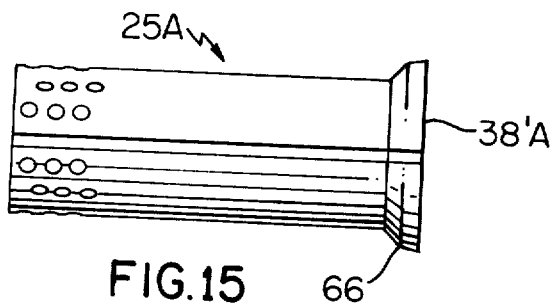
FIG. 15 is a view similar to FIG. 3 and illustrates the shroud of the unit of FIG. 12.

It can be seen in FIG. 15 that the flange end 38'A of the shroud 25A is provided with a step 66 therein which cooperates with a step 67 formed in the main body 22A to more firmly attach the shroud 25A thereto under the compressive force of the compressed resilient means 26A.

Also, it can be seen that the chamber 43A of the main body 22A is provided with a steeper surface 68 than the surface 43' of the main body 22 because of the larger hex 69 whereby it is believed that the more tapered portion 68 will provide better squeezing and sealing of the resilient means 26A when assembled thereto as the sealing means 26A is placed under axial compression between the assembled parts 22A and 23A and, thus, under radial compression by the wedging action produced between the cooperating tapering surfaces of the housing means 22A and the sealing means 26A in the manner previously described.

Therefore, it can be seen that this invention not only provides an improved temperature sensing unit and method of making the same, but also this invention provides an improved sealing member for such a temperature sensing unit or the like and a method of making such a sealing member or the like.

While the forms and methods of this invention now preferred have been illustrated and described as required by the Patent Statute, it is to be understood that other forms and method steps can be utilized and still fall within the scope of the appended claims.

What is claimed is:

1. In a temperature sensing unit having a housing means provided with a chamber therein leading from a temperature sensing area of said housing means to a connector area of said housing means and having an electrical temperature sensor disposed in said sensing area and interconnected by lead means to electrical connector means disposed in said connector area with sealing means being disposed in said chamber to sealingly fill the same and secure said sensor, lead means and connector means in place, the improvement wherein said sealing means comprises a preformed one-piece resilient member that was formed separately from said lead means, connector means, sensor and housing means.

2. A sensing unit as set forth in claim 1 wherein said resilient member has a pair of parts hinged together and folded about said lead means.

3. A sensing unit as set forth in claim 2 wherein said resilient member is under radial compression in said chamber and thereby has said parts compressed against said lead means disposed therebetween.

4. A sensing unit as set forth in claim 3 wherein said resilient member is also placed under axial compression in said chamber.

5. A sensing unit as set forth in claim 3 wherein said connector means has a portion thereof adjacent said lead means also disposed between said folded together parts of said resilient member.

6. A sensing unit as set forth in claim 5 wherein said connector means are longitudinally offset relative to said sensor.

7. A sensing unit as set forth in claim 6 wherein said connector means comprises a pair of spaced apart connector pins.

8. A sensing unit as set forth in claim 7 wherein each part of said resilient member has a surface that will abut said surface of the other part when said parts are folded together, each surface having a pair of grooves therein to respectively receive said portion of said pins therein.

9. A sensing unit as set forth in claim 1 wherein said housing means includes a main body and a tubular shroud carried by said body and defining said sensing area of said housing means, said resilient member securing said tubular shroud to said main body.

10. A sensing unit as set forth in claim 9 wherein said main body has an opening therein receiving an end of said tubular shroud therein, said end of said tubular shroud being flared, said main body having an internal surface mating with said flared end of said tubular shroud, said resilient member filling said flared end of said tubular shroud and compressing said flared end into engagement with said surface to hold said tubular shroud to said body.

11. A sensing unit as set forth in claim 10 wherein said tubular shroud is split from said flared end thereof to the other end thereof.

12. A sensing unit as set forth in claim 1 wherein said housing means includes a main body and a tubular connector secured to said body and defining said connector area of said housing means, said tubular connector having an end flange means, said main body having an end flange means turned over said end flange means of said tubular connector to secure said main body and said tubular connector together.

13. A sensing unit as set forth in claim 11 wherein said resilient member has a radial flange means disposed between said main body and said tubular connector and being radially inwardly spaced from said end flange means of said main body to provide an expansion space between said main body and said tubular section.

14. In a method of making a temperature sensing unit having a housing means provided with a chamber therein leading from a temperature sensing area of said housing means to a connector area of said housing means and having an electrical temperature sensor disposed in said sensing area and interconnected by lead means to electrical connector means disposed in said connector area with sealing means being disposed in said chamber to sealingly fill the same and secure said sensor, lead means and connector means in place, the improvement comprising the step of forming said sealing means to comprise a preformed one-piece resilient member that is formed separately from said lead means, connector means, sensor and housing means.

15. A method of making a sensing unit as set forth in claim 14 and including the step of forming said resilient member to have a pair of parts hinged together, and folding said parts about said lead means.

16. A method of making a sensing unit as set forth in claim 15 and including the step of placing said resilient member under radial compression in said chamber to thereby have said parts compressed against said lead means disposed therebetween.

17. A method of making a sensing unit as set forth in claim 16 and including the step of placing said resilient member under axial compression in said chamber.

18. A method of making a sensing unit as set forth in claim 16 and including the step of also disposing a portion of said connector means adjacent said lead means between said folded together parts of said resilient member.

19. A method of making a sensing unit as set forth in claim 18 and including the step of disposing said connector means to be longitudinally offset relative to said sensor.

20. A method of making a sensing unit as set forth in claim 19 and including the step of forming said connector means to comprise a pair of spaced apart connector pins.

21. A method of making a sensing unit as set forth in claim 20 and including the steps of forming each part of said resilient member to have a surface that will abut said surface of the other part when said parts are folded together, and forming each surface to have a pair of grooves therein to respectively receive said portion of said pins therein.

22. A method of making a sensing unit as set forth in claim 14 and including the steps of forming said housing means to include a main body and a tubular shroud carried by said body and defining said sensing area of said housing means, and securing said tubular shroud to said main body with said resilient member.

23. A method of making a sensing unit as set forth in claim 22 and including the steps of forming said main body to have an opening therein receiving an end of said tubular shroud therein, flaring said end of said tubular shroud, forming said main body to have an internal surface mating with said flared end of said tubular shroud, filling said flared end of said tubular shroud with said resilient member, and compressing said flared end into engagement with said surface with said resilient member to hold said tubular shroud to said body.

24. A method of making a sensing unit as set forth in claim 23 and including the step of forming said tubular shroud with a split from said flared end thereof to the other end thereof.

25. A method of making a sensing unit as set forth in claim 14 and including the steps of forming said housing means to include a main body and a tubular connector secured to said body and defining said connector area of said housing means, forming said tubular connector to have an end flange means, and forming said main body to have an end flange means turned over said end flange means of said tubular connector to secure said main body and said tubular connector together.

26. A method of making a sensing unit as set forth in claim 25 and including the step of forming said resilient member to have a radial flange means disposed between said main body and said tubular connector and being radially inwardly spaced from said flange means of said main body to provide an expansion space between said main body and said tubular section.

27. In a sealing means for a temperature sensing unit having a housing means provided with a chamber therein leading from a temperature sensing area of said housing means to a connector area of said housing means and having an electrical temperature sensor disposed in said sensing area and interconnected by lead means to electrical connector means disposed in said connector area with said sealing means being disposed in said chamber to sealingly fill the same and secure said sensor, lead means and connector means in place, the improvement wherein said sealing means comprises a preformed one-piece resilient member that was formed separately from said lead means, connector means, sensor and housing means.

28. A sealing means as set forth in claim 27 wherein said resilient member has a pair of parts hinged together and adapted to be folded about said lead means.

29. A sealing means as set forth in claim 28 wherein said resilient member is adapted to be under radial compression in said chamber and thereby have said parts compressed against said lead means disposed therebetween.

30. A sealing means as set forth in claim 29 wherein said resilient member is adapted to be under axial compression in said chamber.

31. A sealing means as set forth in claim 29 wherein said resilient member is also adapted to have a portion of said connector means disposed between said folded together parts of said resilient member.

32. A sealing means as set forth in claim 31 wherein each part of said resilient member has a surface that is adapted to abut said surface of the other part when said parts are folded together, each surface having a pair of grooves therein adapted to respectively receive a portion of said connector means therein.

33. A sealing means as set forth in claim 27 wherein said resilient member has a radial flange means adapted to be disposed between a main body of said housing means and a tubular connector of said housing means and be radially inwardly spaced from a flange means of said main body to provide an expansion space between said main body and said tubular section.

34. In a method of making a sealing means for a temperature sensing unit having a housing means provided with a chamber therein leading from a temperature sensing area of said housing means to a connector area of said housing means and having an electrical temperature sensor disposed in said sensing area and interconnected by lead means to electrical connector means disposed in said connector area with said sealing means being disposed in said chamber to sealingly fill the same and secure said sensor, lead means and connector means in place, the improvement comprising the step of forming said sealing means to comprise a preformed one piece resilient member that is formed separately from said lead means, connector means, sensor and housing means.

35. A method of making a sealing means as set forth in claim 34 and including the step of forming said resilient member to have a pair of parts hinged together and adapted to be folded about said lead means.

36. A method of making a sealing means as set forth in claim 35 and including the step of forming said resilient member so as adapted to be under radial compression in said chamber and thereby be adapted to have said parts compressed against said lead means disposed therebetween.

37. A method of making a sealing means as set forth in claim 36 and including the step of forming said resilient member so as adapted to be under axial compression in said chamber.

38. A method of making a sealing means as set forth in claim 36 and including the step of forming said resilient member to be also adapted to have a portion of said connector means disposed between said folded together parts of said resilient member.

39. A method of making a sealing means as set forth in claim 38 and including the steps of forming each part of said resilient member to have a surface that is adapted to abut said surface of the other part when said parts are folded together, and forming each surface to have a pair of grooves therein adapted to respectively receive a portion of said connector means therein.

40. A method of making a sealing means as set forth in claim 34 and including the step of forming said resilient member to have a radial flange means adapted to be disposed between a main body of said housing means and a tubular connector of said housing means and be radially inwardly spaced from a flange means of said main body to provide an expansion space between said main body and said tubular section.

* * * * *